United States Patent [19]

Hölzl

[11] Patent Number: 5,049,757
[45] Date of Patent: Sep. 17, 1991

[54] METHOD FOR SCANNING A PLURALITY OF OPTICAL MEASURING REFLECTORS AND AN APPARATUS FOR PERFORMING THE METHOD

[75] Inventor: Roland Hölzl, Munich, Fed. Rep. of Germany

[73] Assignee: Pruftechnik Dieter Busch+Partner GmbH & Co., Ismaning, Fed. Rep. of Germany

[21] Appl. No.: 504,652

[22] Filed: Apr. 4, 1990

[30] Foreign Application Priority Data

Apr. 15, 1989 [DE] Fed. Rep. of Germany ....... 3912406

[51] Int. Cl.$^5$ ............................................. G01N 21/86
[52] U.S. Cl. .................................. 250/561; 250/225; 356/364
[58] Field of Search ................ 250/561, 225; 356/364, 356/375, 152

[56] References Cited

U.S. PATENT DOCUMENTS 3,981,587  9/1976  Gievers ............................. 250/225
4,774,405  9/1988  Malin ................................. 250/225

Primary Examiner—Edward P. Westin
Assistant Examiner—K. Shami
Attorney, Agent, or Firm—Fiddler & Levine

[57] ABSTRACT

A method for scanning a plurality of optical measuring reflectors adapted to reflect a scan beam in a position-related manner to a position detector, which supplies signals relating to the position of the beam incidence point in the detector plane. So far a separate scan beam has been generated for each measuring reflector and there has been a separate position detector for use therewith. In accordance with the invention a single common linearly polarized scan beam L1 and a single common detector D are provided and by turning the plane of polarization of the scan beam under electronic control and by the use of further optical means the scan beam is switched over as desired to a selected measuring reflector, which then reflects the incident scan beam to the common position detector D in position-related manner.

18 Claims, 4 Drawing Sheets

FIG. 3
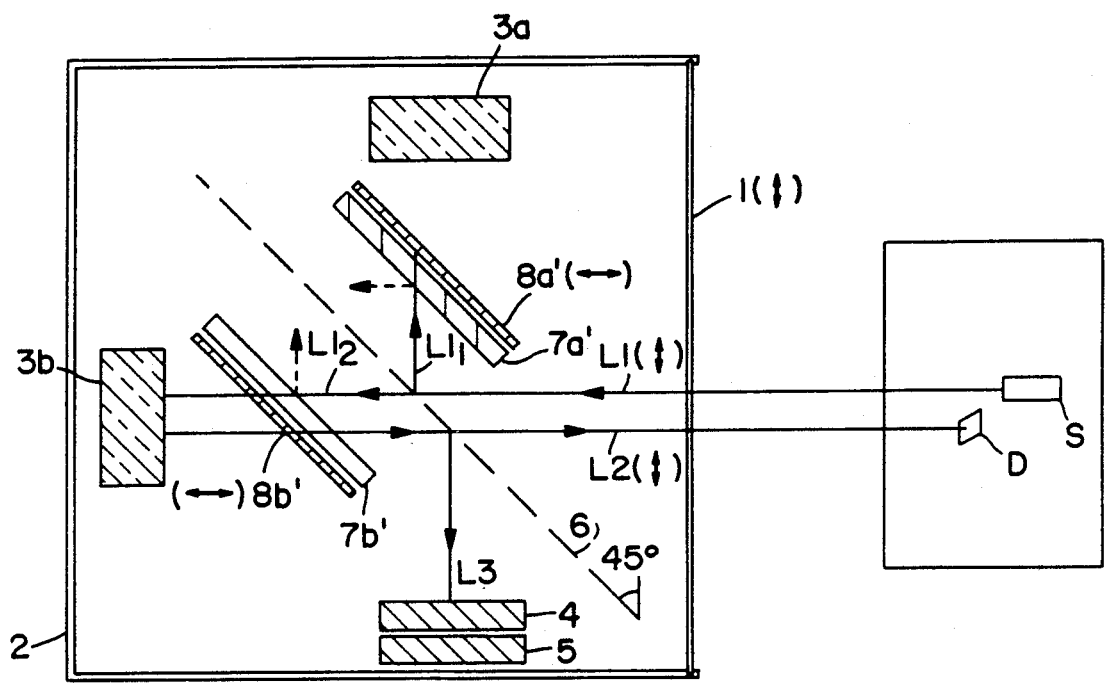
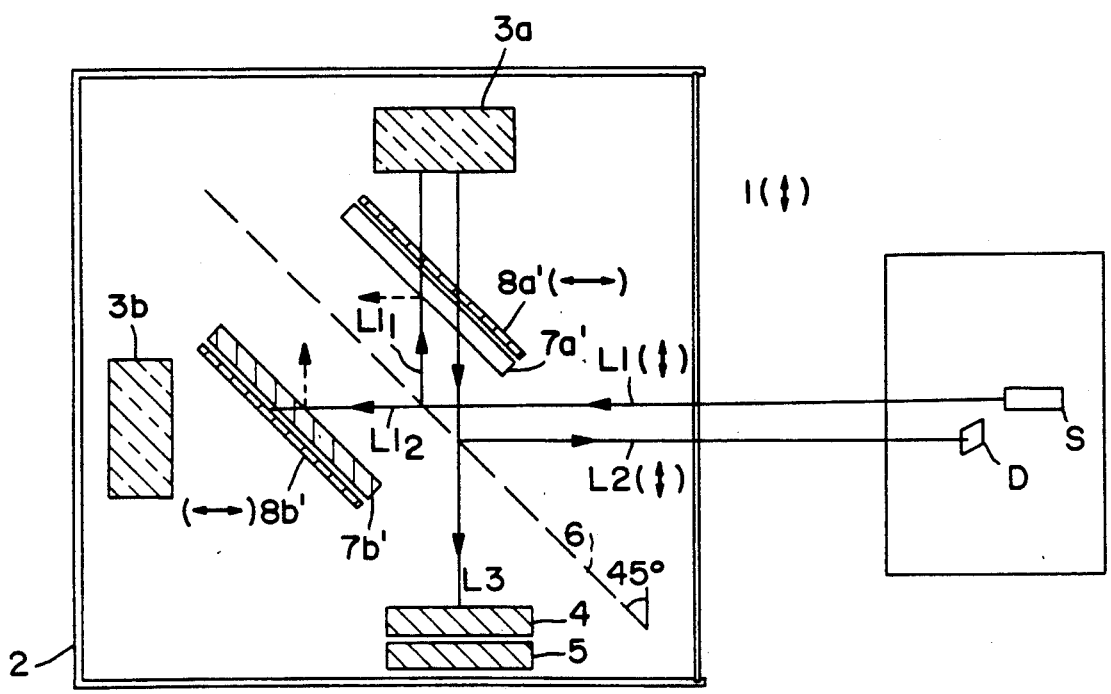
FIG. 4

METHOD FOR SCANNING A PLURALITY OF OPTICAL MEASURING REFLECTORS AND AN APPARATUS FOR PERFORMING THE METHOD

BACKGROUND OF THE INVENTION

The invention relates to a method for scanning a plurality of optical measuring reflectors which are each arranged to reflect an optical low divergence scanning beam emitted as a reference, more particularly in the form of a laser beam, at a reflection angle dependent on the position in space of a respective object of interest to an optoelectronic position detector, which supplies electric measurement data signals which correspond to the size of, and when appropriate, the direction of the distance of the point of incidence of the reflected scan beam from a reference point of the position detector, and also to a modified form of this method using measuring reflectors which are in the form of rectangular roof prisms placed so that their hypothenuse plane is generally parallel to the scan beam incident thereon. The invention also relates to apparatus for performing such method.

Measuring instruments using laser optics frequently involve a plurality of measuring reflectors, which may be different, such as mirrors, prisms and the like, which reflect a laser beam directed onto them to read or detect their instantaneous position respectively to a position detector, which supplies signals corresponding to the position of measurement and dependent on the point of incidence of the reflected beam in the detector plane.

In known methods designed for this purpose for each measuring reflector there has been a separate laser beam with a separate beam source and a separate position detector. This led to a complex apparatus and also necessitated a coordination of the individual laser beams and position detectors in relation to each other in order to obtain measurement data derived from the different measuring positions of the measuring reflectors.

SHORT SUMMARY OF THE PRESENT INVENTION

One object of the invention is to substantially reduce the amount of instrumentation complexity required for performing the said method.

A further object of the invention is at the same time to obtain the precise measurement data in a simpler manner than has so far been the case by being able to dispense with a special coordination of a plurality of laser beams and position detectors.

In accordance with the invention a first form of the method used for achieving these or other objects is characterized in that a common radiation source and a common position detector are used for all measuring reflectors and in that:

(a) the scan beam emitted by the radiation source is split up into a number, corresponding to the number of measuring reflectors, of beam parts directed respectively to another respective one of such reflectors, (b) the beam parts are polarized, (c) the polarization of the polarized beam parts is analyzed before reaching the individual reflectors and the respective beam part is only allowed to reach its respective reflector if the direction of polarization complies with a direction as preset for such reflector, and (d) the direction of polarization of the polarized beam parts is so set by controlled rotation of their planes of polarization before reaching the polarization analyzers that it is only in the case of one reflector able to be selected in this manner that this direction of polarization complies with the direction of polarization as set for the reflector, while in the case of the others it is generally normal thereto.

In the case of the use of measuring reflectors in the form of right angle roof prisms as a second form of the method, which are arranged so that their hypotenuse plane is generally perpendicular to the scan beam incident thereon the method is such that, using a common beam emitter and a common position detector for all roof prisms:

(a) the roof prisms are placed one after the other in the direction of the incident scan beam, (b) the scan beam is polarized, (c) the material at least of those prisms located before the rearmost one is so selected that the angle of incidence of the scan beam at the respective roof surface, placed in its direction of these prisms, is equal to the Brewster angle, and (d) the plane of polarization of the polarized scan beam is so set by controlled turning before the foremost prism that at the prism selected for scanning at the roof surface struck by the scan beam there is reflection to the other roof surface, whereas the roof surfaces placed in the direction of the scan beam or any such prisms before it, allow the passage of the scan beam.

A first form of the apparatus of the invention for attaining the object herein may comprise reflectors for the position-dependent reflection of a low-divergence incident optical scan beam, more especially constituted by a laser beam, in the case of which each reflector is associated with a radiation source emitting the scan beam as a reference and a position detector to receive the reflected scan beam, characterized by (a) a single radiation source, which is common to all the reflectors, for the scan beam, (b) a single position detector common to all the reflectors, (c) a beam splitting device for the splitting of the scan beam, emitted by the radiation source, into beam parts, of which each is directed towards a different one of the reflectors, (d) a polarizing device for the linear polarization of the beam parts, (e) a device for the controlled rotation of the polarization plane of the beam parts through about 90° as a device for turning the direction of polarization, and (f) a respective polarization analyzer placed between the polarization rotation device and the reflector, for each respective beam part.

In accordance with a second form of the apparatus of the invention using right angle roof prisms for the position-dependent reflection of a low-divergence incident optical beam, more especially in the form of a laser beam, it is possible for each roof prism to be associated with a radiation source emitting the scan beam as a reference beam and with a position detector receiving the reflected scan beam characterized by the following:

(a) a single radiation source, common to all the roof prisms for the scan beam, (b) a single position detector common to all the roof prisms, (c) said prisms being aligned sequentially in the direction of the incident scan beam, (d) a polarizing device for the linear polarization of the scan beam before reaching the foremost roof prism, and (e) a device arranged between the polarizing device and the foremost roof prism for the controlled rotation of the plane of polarization of the scan beam through an angular range of approximately 90° as a device for rotating the plane of polarization, the material of at least those prisms, which are in front of the rearmost one, being so selected that the angle of incidence of the scan beam at the roof surfaces aligned with its direction, of these prisms is equal to the Brewster angle.

In accordance with the method of the invention as defined in the first form thereof on the one hand and of the second form of the method on the other only a single laser beam is primarily produced for scanning or interrogating the individual measuring reflectors so that only a single radiation source is needed. In accordance with the first form of the method in accordance with the invention this primary laser beam is split up into beam parts, which are directed towards the reflectors and reflected therefrom in accordance with the position. Of the beam parts only one is allowed to pass to an associated reflector and reflected thereby to a position detector common to all the beam parts. The interrogation of the individual reflectors is performed time-sequentially since it is always a different beam part which is able to reach a reflector and is able to be reflected thereby, whereas all other ones are turned off.

In the second possible form of the method the supply of the interrogating laser beam to the reflectors (which in this form of the method are in the form of roof prisms arranged one behind the other) takes place, since different Brewster angles are set at the different roof prisms so that one of them is brought into the reflecting condition at a time, whereas all the others, arranged in front of it, remain transparent for the interrogating laser beam. In this case as well, as in the first form of the method, there is only one single laser beam produced by a common radiation source and a single position detector for all possible reflected beams.

The two alternatives, that is to say the first and second forms of the method as mentioned above, thus involve a much smaller degree of apparatus complexity; and the coordination of a plurality of primary laser beams and a plurality of position detectors are no longer needed owing to the use of only one single, common radiation source and of a single, common position detector.

Further forms of the invention are described in the claims.

The invention will now be described in more detail with reference to the working examples as shown in the diagrammatic drawings.

LIST OF THE SEVERAL FIGURES OF THE DRAWINGS

FIG. 3 and FIG. 4 show a second working embodiment of the apparatus for performing the first form of the method with a setting of the polarization rotating device which is different in the two FIGS. 3 and 4.

DETAILED DESCRIPTION OF EMBODIMENTS OF THE INVENTION

Figure 1:
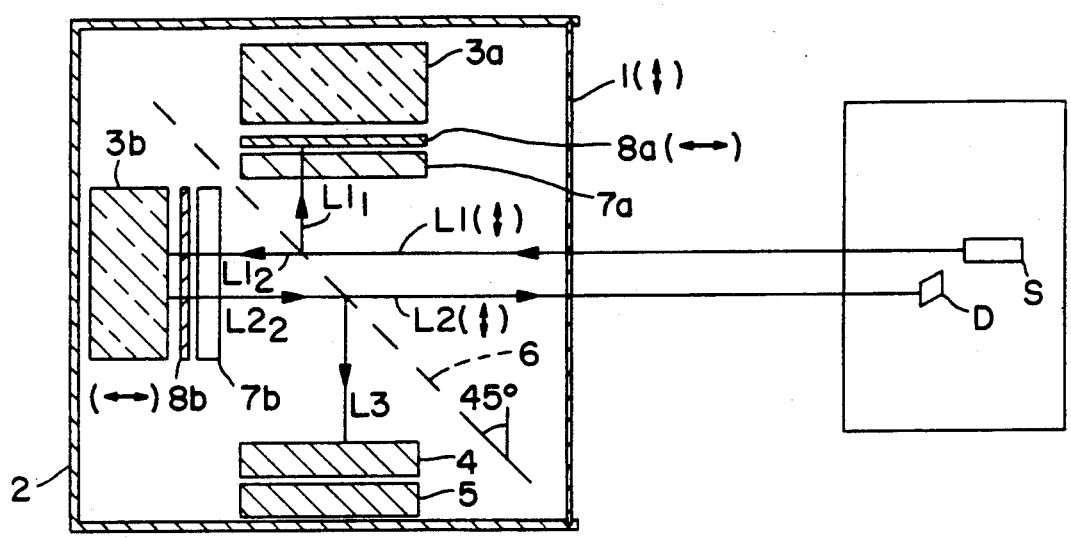
FIG. 1 and FIG. 2 show a first working embodiment of an apparatus for performing the first form of the method as noted above, FIGS. 1 and 2 showing different settings of the polarization direction rotating means.

In the apparatus of FIG. 1 a radiation source S produces electromagnetic radiation with a very low degree of divergence, which here, and in the case of the other forms of the invention, is in the form of a laser beam L1, which passes through a polarizing filter 1 and then enters a housing 2, in which there are two measuring reflectors 3a and 3b with mutually perpendicular planes of reflection and a photodiode array 4 with an associated electronic circuit 5 with a fixed three-dimensional relationship between the parts. The photodiode array 4 has a plane of incidence which is parallel to the measuring reflector 3a and is generally opposite thereto. In the housing a semi-transparent mirror 6 is arranged with its mirror surface so as to halve the angle between the reflection planes of the measuring reflectors 3a and 3b. The laser beam L1 is incident to this mirror at about 45° to the mirror plane so that the beam is split up into two beam parts $L1_1$ and $L1_2$, of which the one ($L1_1$) is generally perpendicular to reflection plane of the measuring reflector 3a and the other ($L_2$) is directed so as to be generally normal to the reflection plane of the measuring reflector 3b. In the path of the beam parts $L1_1$ and $L1_2$ polarization rotation devices 7a and, respectively, 7b are arranged and between the latter and the respective measuring reflector 3a and, respectively, 3b there is a polarization analyzer 8a and, respectively, 8b in the form of a polarization filter. The polarization analyzers 7a and 7b have generally the same directions of polarization in relation to each other.

The polarizer 1 polarizes the incident laser beam L1 in the direction parallel to the plane of the drawing for instance so that the beam parts $L1_1$ and $L1_2$ as well are polarized in the same direction. However the polarization direction turning devices are so set in relation to each other that the one of them turns the polarization direction of the incident beam part through 90°, while on the other hand the other leaves the direction of polarization unchanged. The polarization direction turning device 7a and 7b, which turns the direction of polarization, is marked as a white area and the one that does not cause any rotation is marked as a shaded area. The direction of polarization of the analyzers is perpendicular to the polarization of the laser beam L1 produced in the polarizer 1 so that in FIG. 1 the beam part $L1_1$ directed upwards to the measuring reflector 31 without turning of the direction of polarization is suppressed by the analyzer 8a on its path towards the measuring reflector 3a, whereas the beam part $L1_2$, whose plane of polarization is twisted by the polarization turning device 7b through 90° and thus is the same as that of the analyzer 8b, is able to reach the measuring reflector 3b and is reflected thereby in a way dependent on its respective measuring setting in relation to the incident beam part $L1_2$, such reflection being at a corresponding angle. Owing to the identity of the polarization direction the reflected beam passes through the analyzer and is turned back by the polarization direction turning device 7b along the original direction of polarization of the incident beam part $L1_2$ and with this direction of polarization it is able to pass back through the polarizer 1 to the outside and to the position detector, which in a way dependent on the point of incidence of the reflected beam on the detector plane supplies electrical signals relating to a reference point in the detector plane.

On passage through the semi-transparent mirror 6 a further beam part L3 is split off from the reflected beam part $L2_2$ and this beam part L3 strikes the photodiode array 4. This beam part L3 may be used together with the diode array and the electronic circuitry 4 to switch over the polarization turning devices 7a and 7b respectively in the opposite direction either under the control of a clock or by means of a signal with which the laser beam is modulated, such signal being evaluated in the electronic circuitry 5 after demodulation.

Figure 2:
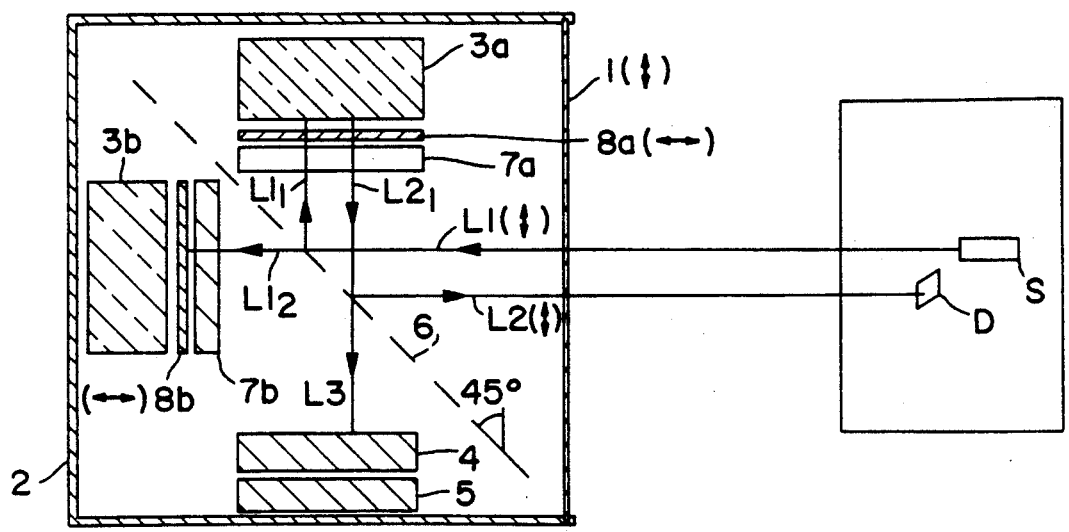

FIG. 2 only differs from FIG. 1 inasmuch as in its case the functions of the polarization turning devices 8a and 8b are changed over. In this case the polarization turning device 8a turns the direction of polarization of the upwardly directed beam part $L1_1$ passing to the reflector 3a, whereas the polarization turning device 8b leaves the polarization direction of the beam part $L1_2$ unchanged so that the beam part $L1_1$ reaches the measuring reflector and the beam part $L1_2$ is turned off. The reflection of the beam part $L1_1$ takes place in the manner described above in connection with FIG. 1.

The polarizers 7a and 7b may be in the form of voltage-controlled liquid crystal elements, which are particularly suitable for this purpose.

The design of FIGS. 3 and 4 differs from that of FIGS. 1 and 2 since the polarization turning devices 7a' and 7b' and furthermore the analyzers 8a' and 8b' are aligned so as to be respectively parallel to the semitransparent mirror 6, that is to say, they are at an angle of 45° to the incident beam part $L1_1$ and, respectively, $L1_2$ so that the part of the radiation which is marked in broken lines in the drawing and which is unavoidably reflected at the entry planes of these components is radiated in a direction perpendicular to the respectively incident beam part $L1_1$ and, respectively, $L1_2$ to the side and is not directed back into the the incoming beam part and does not cause any interference.

In other respects the function of the apparatus is the same as that of the apparatus of FIGS. 1 and 2, FIGS. 3 and 4 also showing different settings of the polarization turning devices 7a' and 7b' with the respective ray path.

Figure 5:
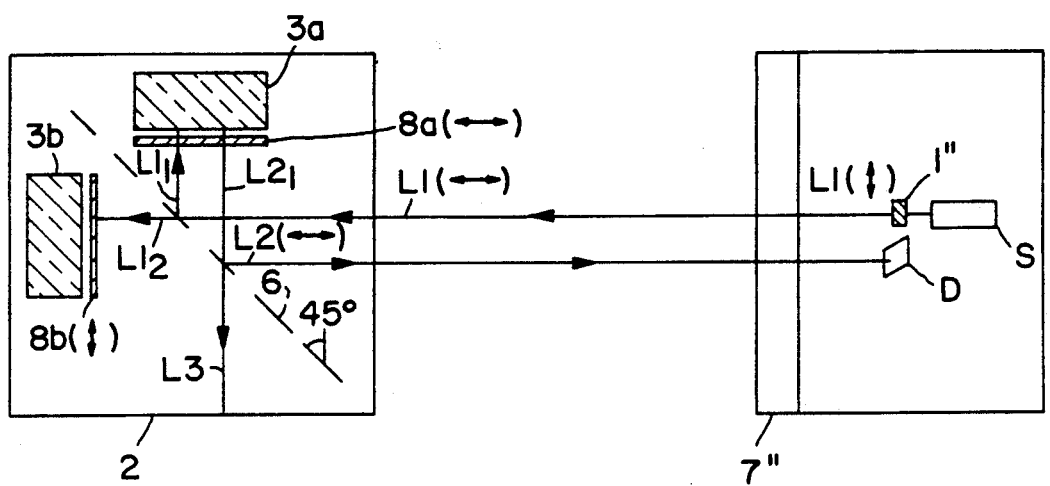
FIG. 5 and FIG. 6 show a third form of the apparatus for performing the method as noted above with a setting of the polarization rotating means common to the two reflectors which is different in FIGS. 5 and 6.
Figure 6:
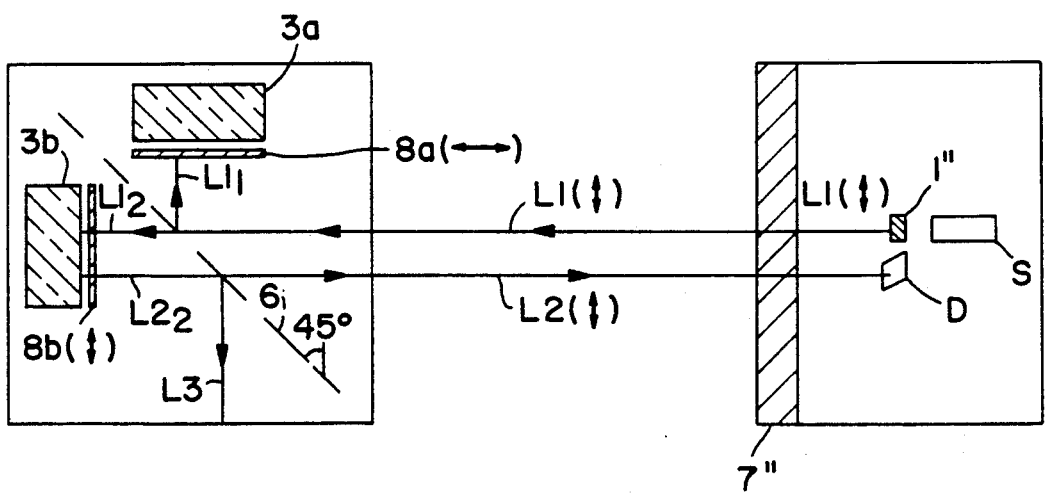

The apparatus of FIGS. 5 and 6 differs from that of FIGS. 1 and 2 in that the polarizer 1" and the polarization direction turning device 7" are associated with the components jointly accommodated in the housing 2 and are directly placed in the path main of the laser ray L1 emitted by the radiation source S. In this manner as well the two beam parts $L1_1$ and $L1_2$ reach the analyzers 8a and 8b with the same polarization so that owing to the directions (which are different here) of polarization of the latter in each case only one of them is allowed to pass while the other is suppressed, this polarization direction of the beam parts being able to be jointly turned so that the desired change over from one reflector 3a to the other (3b) is possible with the common polarization turning device 7".

FIGS. 5 and 6 show the polarization turning device 7" in its two different settings with the respective ray path.

Figure 7:
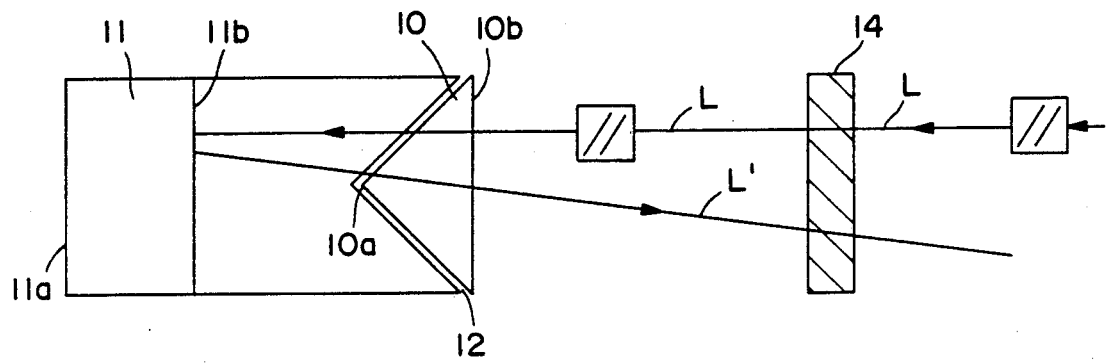
FIG. 7 and FIG. 8 show an apparatus for performing the second form of the method with settings of the polarization rotation device, common to all the reflectors here as well, which is different in FIGS. 7 and 8.
Figure 8:
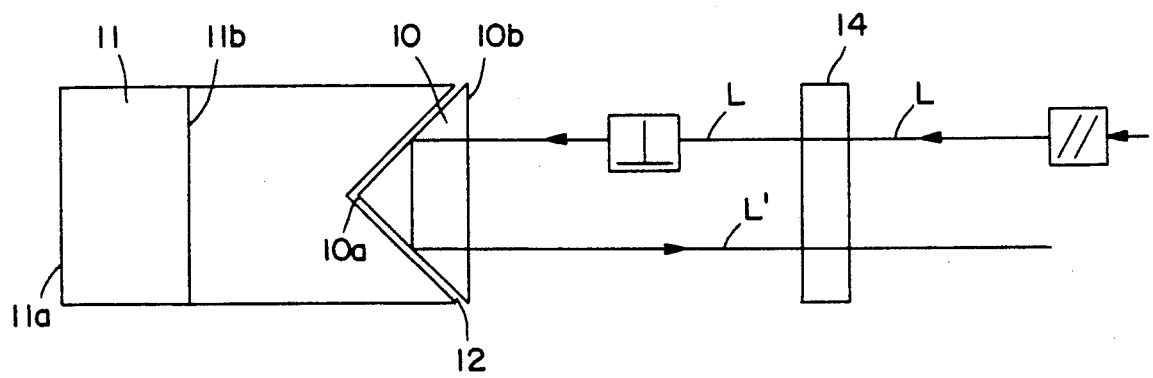

In the case of the apparatus of FIGS. 7 and 8 two roof prisms 10 and 11 are so arranged with a mutual spacing and one after the other in the path of a laser beam L, whose source is not shown, that the laser beam L is able to impinge on their hypotenuse plane 10b and, respectively, 11b opposite to their apices 10a and, respectively, 11a, in a generally perpendicular direction to such plane. In relation to each other the roof prisms are so aligned that their apices 10a and 11a extend generally perpendicularly to each other. The roof prisms 10 and 11 are so aligned in relation to each other that their apices 10a and 11a extend generally perpendicularly to each other. The space between the roof prisms 10 and 11 is partly filled with a glass extension member 13 leaving a gap 12. On the path of the laser beam L a polarizer, not shown, is arranged and between the latter and the first prism 10 there is a polarization turning device 14, as for instance in the form of a liquid crystal element. The squares marked in the path of the laser ray L indicate in parallel shading lines a given direction of polarization, at which the E vector is parallel to the plane of the drawing for instance, while the lines which are perpendicular to each other indicate the polarization direction perpendicular thereto, that is to say in the present case the direction in which the E vector is perpendicular to the plane of the drawing. A glance at FIGS. 7 and 8 will make it clear that using the polarization turning device it is possible to turn the polarization direction of the laser L beam emerging therefrom in relation to the incident laser beam through 90°.

In the case of the apparatus of FIGS. 7 and 8 the effect of the Brewster angle is used to switch over interrogation from one roof prism to another. The Brewster angle is defined as follows in connection with passage from one medium to another taking into account the refractive indices of the media:

Brewster angle = arctan(n2/n1).

If polarized light arrives at an interface between media at this angle, a change in the direction of polarization of the light, in this case the laser beam L, will cause a change in the coefficient of reflection of the media interface, that is to say a change over from reflection to transmission or vice versa. In order to be able to utilize this effect, the first prism 10 has to be transparent to light in the sense that it does not have any mirror coated surfaces. The second prism 11 has mirror coated surfaces in order to ensure that in its case like in the case of the first prism, light falling on the roof face will not suffer any change in the polarization direction on reflection to the other roof face and furthermore on renewed reflection from the latter to a position detector, which is not shown, since such a change might interfere with the passage of the reflected light beam L' through the air gap 12 and the roof prism 10.

The material used for the prism 10 and the material in the gap 12, as for instance air or optical cement, are so selected that owing to the Brewster effect—given the polarization direction indicated in FIG. 7 of the incident laser beam—the prism will be transparent therefor, while on the other hand in the case of the polarization direction of FIG. 8 it will reflect the incident beam in the manner indicated. Thus, in the first case the laser beam L interrogates the rear roof prism 11 and in the latter case the front roof prism 10. The point of incidence of the reflected light beam L' in relation to a reference point on the detector indicates the respective position of the interrogated roof prism 10 or 11 and the detector supplies corresponding signals.

Therefore the apparatus in accordance with FIGS. 7 and 8 operates in accordance with the second method noted supra, the measuring range for the roof prisms 10 and 11 generally being limited to very small displacements.

The materials presently available for the roof prisms do not make it so far possible to completely switch over between reflection and transmission. This difficulty may however be met by measures connected with the detector and, respectively, the path of the light beam L' having undergone renewed reflection, such measures possibly later proving superfluous when new materials become available for the roof prism 10.

I claim:

1. A method for scanning a plurality of optical measuring reflectors which are each arranged to reflect an optical low divergence scanning beam emitted as a reference, more particularly in the form of a laser beam, at a reflection angle dependent on the position in space of a respective object of interest to an optoelectronic position detector, which supplies electric measurement data signals which correspond to the size of and, when appropriate, the direction of the distance of the point of incidence of the reflected scan beam from a reference point of the position detector, characterized in that a common radiation source and a common position detector are employed for all measuring reflectors and in that:
   (a) the scan beam emitted by the radiation source is split up into a number, corresponding to the number of reflectors, of beam parts directed respectively to another respective one of such reflectors,
   (b) the beam parts are polarized,
   (c) the polarization of the polarized beam parts is analyzed before reaching the individual reflectors and the respective beam part is only allowed to reach its respective reflector if the direction of polarization complies with a direction as preset for such reflector, and
   (d) the direction of polarization of the polarized beam parts is so set by controlled rotation of their planes of polarization before reaching the polarization analyzers that it is only in the case of one reflector able to be selected in this manner that this direction of polarization complies with the direction of polarization as set for the reflector, while in the case of the others it is generally normal thereto.

2. An apparatus for performing the method as claimed in claim 1 comprising reflectors for the position-dependent reflection of a low-divergence incident optical scan beam, more especially constituted by a laser beam, in the case of which each reflector is associated with a radiation source emitting the scan beam as a reference and a position detector to receive the reflected scan beam, and characterized by
   (a) a single radiation source, which is common to all the reflectors, for the scan beam,
   (b) a single position detector common to all the reflectors,
   (c) a beam splitting device for the splitting of the scan beam emitted by the radiation source, into beam parts, of which each is directed towards a different one of the reflectors,
   (d) a polarizing device for the linear polarization of the beam parts,
   (e) a device for the controlled rotation of the polarization plane of the beam parts through about 90° and a respective polarization analyzer placed between the polarization rotation device and the reflector, for each respective beam part.

3. The apparatus as claimed in claim 2 wherein the polarizing device is arranged jointly for all beam parts between the radiation source and the beam splitting device.

4. The apparatus as claimed in claim 3, wherein the device for turning the direction of polarization is arranged for all beam parts jointly before the beam splitting device.

5. The apparatus as claimed in claim 2, comprising a separate device for turning the direction of polarization for each beam part behind the beam splitting device.

6. The apparatus as claimed in claim 5, wherein the polarizing device for each beam part is also arranged separately behind the beam splitting device.

7. The apparatus as claimed in claim 5, wherein the beam incidence planes of the analyzers, of the devices for turning the direction of polarization, and any polarizing devices are arranged at an angle, which is substantially different to 90°, to the beam part coming from the beam splitting device.

8. The apparatus as claimed in claim 2, wherein the devices for turning the direction of polarization include voltage-controlled liquid crystal elements.

9. The apparatus as claimed in claim 2, wherein the polarizing device and the analyzers include polarization filters.

10. The apparatus as claimed in claim 2, wherein the measuring reflectors are so arranged that their beam incidence directions are perpendicular to each other.

11. The apparatus as claimed in claim 2, wherein the measuring reflectors are in the form of reflectors selected from the group consisting of roof prisms and equivalent mirror means, the hypotenuse thereof plane being perpendicular to the incident beam part, and wherein said position detector is biaxial.

12. The method as claimed in claim 1 using right angle roof prisms, which are arranged so that their hypotenuse plane is generally perpendicular to the scan beam incident thereon and using a common beam emitter and a common position detector for all roof prisms:
   (a) the roof prisms are placed one after the other in the direction of the incident scan beam,
   (b) the scan beam is polarized,
   (c) the material at least of those prisms located before the rearmost one is so selected that the angle of incidence of the scan beam at the respective roof surface aligned, placed in its direction, of these prisms is equal to the Brewster angle, and
   (d) the plane of polarization of the polarized scan beam is so set by controlled turning before the foremost prism that at the prism selected for scanning at the roof surface struck by the scan beam there is reflection to the other roof surface, whereas the roof surfaces placed in the direction of the scan beam or any such prisms before it allow the passage of the scan beam.

13. The method as claimed in claim 12, wherein the roof prisms are so arranged that the roof crest thereof intersects the roof crest of the foremost prism, such intersection being such that in the case of there being more than two prisms the intersection angles are different.

14. An apparatus for performing the method as claimed in claim 12, using a right angle roof prism for the reflection of a low-divergence incident optical beam, more especially in the form of a laser beam, each roof prism being associated with a radiation source emitting the scan beam as a reference beam and with a position detector receiving the reflected scan beam characterized by:
(a) a single radiation source, common to all the roof prisms for the scan beam,
(b) a single position detector common to all the roof prisms,
(c) said prisms being aligned sequentially in the direction of the incident scan beam,
(d) a polarizing device for the linear polarization of the scan beam before reaching the foremost roof prism, and
(e) a device arranged between the polarizing device and the foremost roof prism for the controlled rotation of the plane of polarization of the scan beam through an angular range of approximately 90°,
the material of at least those prisms, which are in front of the rearmost ones, being so selected that the angle of incidence of the scan beam at the roof surfaces aligned with its direction, of these prisms is equal to the Brewster angle.

15. The apparatus as claimed in claim 14, wherein the roof prisms are so aligned angularly that their roof crest intersects the roof crest of the foremost prism, possibly with a different angle of intersection.

16. The apparatus as claimed in claim 15 comprising two prisms whose roof crests intersect at an angle of approximately 90°.

17. The apparatus as claimed in claim 14, wherein a part for a gap along the respectively foregoing prism the space between sequentially placed prisms is filled with a medium which is transparent for the scan beam, such medium having approximately the same refractive index as the prisms.

18. The apparatus as claimed in claim 17 wherein the gap is an air gap.

* * * * *